(12) United States Patent
Oaten et al.

(10) Patent No.: US 7,987,127 B1
(45) Date of Patent: *Jul. 26, 2011

(54) TOTAL FAIR VALUE SWAP

(75) Inventors: David A Oaten, Tenafly, NJ (US);
Stephen J Wolf, Great Neck, NY (US);
Pankaj Jhamb, Jersey City, NJ (US)

(73) Assignee: JP Morgan Chase Bank, NA, New York, NY (US)

(\*) Notice: Subject to any disclaimer, the term of this patent is extended or adjusted under 35 U.S.C. 154(b) by 0 days.

This patent is subject to a terminal disclaimer.

(21) Appl. No.: 12/505,171

(22) Filed: Jul. 17, 2009

Related U.S. Application Data

(62) Division of application No. 11/342,559, filed on Jan. 31, 2006, now Pat. No. 7,567,928.

(60) Provisional application No. 60/715,576, filed on Sep. 12, 2005.

(51) Int. Cl.
*G06Q 40/00* (2006.01)

(52) U.S. Cl. .................. 705/35; 705/36 R; 705/37

(58) Field of Classification Search .............. 705/35, 705/36 R, 37
See application file for complete search history.

(56) References Cited

U.S. PATENT DOCUMENTS

| | | | |
|---|---|---|---|
| 6,304,858 B1* | 10/2001 | Mosler et al. | 705/37 |
| 6,347,307 B1* | 2/2002 | Sandhu et al. | 705/36 R |
| 7,567,928 B1* | 7/2009 | Oaten et al. | 705/35 |
| 2006/0143099 A1* | 6/2006 | Partlow et al. | 705/35 |
| 2006/0190377 A1* | 8/2006 | Stanley et al. | 705/35 |

OTHER PUBLICATIONS

Options Futures and Other Derivatives, John C. Hull, 5th Ed. Prentice Hall, 2003 (hereinafter Hull), pp. 145, 625, 640-642, 645-647.*

\* cited by examiner

*Primary Examiner* — Olabode Akintola
*Assistant Examiner* — Kellie Campbell
(74) *Attorney, Agent, or Firm* — Goodwin Procter LLP

(57) ABSTRACT

A synthetic instrument known as a "Total Fair Value Swap" is disclosed. According to one embodiment, the Total Fair Value Swap may comprise an agreement between two counterparties, a "Fixed Rate Payer" and a "Floating Rate Payer". According to the agreement, the Fixed Rate Payer makes a stream of payments to the Floating Rate Payer based on a fixed rate, and the Floating Rate Payer makes a second stream of payments to the Fixed Rate Payer based on a floating rate, wherein a first portion of the floating rate is based on a reference interest rate, and wherein a second portion of the floating rate is based on a credit spread associated with the Floating Rate Payer. The reference interest rate may be, for example, London Inter-Bank Offer Rate (LIBOR), prime interest rate, the US dollar swap rate, the U.S. Treasury Bond rate or any other widely traded interest rate that is reset periodically. The credit spread may be observed from the Credit Default Swap (CDS) market.

8 Claims, 5 Drawing Sheets

Figure 3

Economics of the Total Fair Value Swap for Company

| Component Details | A<br>Bond | | B<br>Interest Rate Swap | | C<br>CDS Swap | | D<br>Fair Value Swap |
|---|---|---|---|---|---|---|---|
| Notional | 250mm | | 250mm | | 250mm | | 250mm |
| Maturity Date | 5yr | | 5yr | | 5yr | | 5yr |
| Call Date | None | | None | | None | | None |
| Coupon Details | | | | | | | |
| 5yr US T-Bond | 4.08% | | | | | | |
| + 5yr Swap Spread | 0.47% | | | | | | |
| = 5yr Swap rate | 4.55% | | | | | | |
| + 5yr Credit Spread (CDS) | 1.35% | | | | | | |
| Company 5yr Coupon | 5.90% | | | | | | |
| Fair Value Hedge Build-Up | | | | | | | |
| Company receives: | | | 4.55% | + | 1.35% | = | 5.90% |
| Company pays: | | | 3mo LIBOR | + | 0.74 * [simple arithmetic average of 5yr CDS] | = | 3mo LIBOR + 0.74 * [simple arithmetic average of 5yr CDS] |
| 1st period LIBOR setting | | | 3.12% | | | | 3.12% |
| 1st period 5yr CDS average setting | | | - | | =0.74*1.35% = 0.999% | = | 0.999% |
| 1st period all-in setting | | | 3.12% | + | 0.999% | = | 4.12% |
| Initial savings | | | 1.43% | + | 0.35% | = | 1.78% |
| Cap on CDS settings | | | - | | 8.50% | = | 8.50% |

# TOTAL FAIR VALUE SWAP

CROSS-REFERENCE TO RELATED APPLICATIONS

This application is a divisional of U.S. patent application Ser. No. 11/342,559, entitled "Total Fair Value Swap," filed Jan. 31, 2006, which claimed priority to U.S. Provisional Patent Application Ser. No. 60/715,576, filed on Sep. 12, 2005. Each of these earlier applications is incorporated herein by reference in its entirety.

FIELD OF THE INVENTION

The present invention relates generally to financial instruments. More particularly, the present invention relates to a synthetic instrument referred to as a "Total Fair Value Swap."

BACKGROUND OF THE INVENTION

Apart from issuing equity securities, corporations can fund themselves by issuing long-term and/or short-term debt. In the long-term debt market, a company can issue one or more fixed-rate bonds to investors for a tenor of 2-30 years, for example. During the term of a fixed-rate bond, the company makes periodic coupon payments to the bondholders based on a fixed interest rate. In the short-term debt market, a company can issue short-term floating-rate instruments or commercial paper which provide short-term liquidity, wherein the interest rates may be reset, for example, on a weekly, monthly or quarterly basis.

Historically, floating-rate funding has been (almost invariably) cheaper than fixed-rate funding. However, long-term funding provides a corporation with greater certainty as to cash flow. There is significant demand for the low cost offered by floating-rate funding to be combined with the certainty offered by fixed-rate funding. No existing financial instrument appears to meet that demand.

In view of the foregoing, it would be desirable to provide a funding solution which overcomes the above-described deficiencies and shortcomings.

SUMMARY OF THE INVENTION

One embodiment of the present invention comprises a synthetic instrument referred to as a "Total Fair Value Swap." The Total Fair Value Swap may comprise an agreement between two counterparties, a "Fixed Rate Payer" and a "Floating Rate Payer". According to the agreement, the Fixed Rate Payer may make a first stream of payments to the Floating Rate Payer, wherein the first stream of payments may be based on either a truly fixed interest rate or a reference rate that is periodically reset. The Floating Rate Payer may make a second stream of payments to the Fixed Rate Payer based on a floating rate, wherein a first portion of the floating rate is based on a reference interest rate, and wherein a second portion of the floating rate is based on a credit spread associated with the Floating Rate Payer. The reference interest rate may be, for example, London Inter-Bank Offer Rate (LIBOR), prime interest rate, the US dollar swap rate, the U.S. Treasury Bond rate or any other widely traded interest rate that is reset periodically. The credit spread may be observed from the Credit Default Swap (CDS) market.

Additional features and advantages of the invention will be set forth in the description that follows. The objectives and other advantages of the invention will be realized and attained by the system and methods, particularly pointed out in the written description hereof as well as the appended drawings.

Another embodiment of the present invention resides in a computer-based financial system for facilitating a Total Fair Value Swap transaction between a first counterparty and a second counterparty. The system may comprise means for interfacing the first and second counterparties to the system. The system may also comprise database means for storing and maintaining records related to the Total Fair Value Swap transaction, the records reflecting the first counterparty's obligation to make one or more fixed payments to the second counterparty and the second counterparty's obligation to make one or more floating payments to the first counterparty, wherein the one or more fixed payments are based on a reference interest rate and the one or more floating payments are based at least in part on a credit spread associated with the second counterparty. The system may further comprise rate monitoring means for deriving the credit spread from a credit default swap market and for periodically determining the floating payment amount based at least in part on the credit spread. The system may additionally comprise transaction management means, operatively coupled to the means for interfacing, the database means and the rate monitoring means, for tracking the one or more fixed payments and the one or more floating payments.

A further embodiment of the present invention resides in a computer-implemented method for facilitating a Total Fair Value Swap transaction between a first counterparty and a second counterparty. The method may comprise the steps of: maintaining an electronic record related to the Total Fair Value Swap transaction, the record reflecting the first counterparty's obligation to make one or more fixed payments to the second counterparty and the second counterparty's obligation to make one or more floating payments to the first counterparty; calculating an amount for each fixed payment based on a reference interest rate; deriving, from a credit default swap market, a credit spread associated with the second counterparty at a specified time prior to each floating payment; determining an amount for each floating payment based at least in part on the credit spread; and managing the one or more fixed payments and the one or more floating payments.

The present invention will now be described in more detail with reference to exemplary embodiments thereof as shown in the accompanying drawings. While the description below makes reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

The purpose and advantages of the present invention will be apparent to those of skill in the art from the following detailed description in conjunction with the appended drawings in which like reference characters are used to indicate like elements.

FIG. 3 shows the economics of the exemplary Total Fair Value Swap transaction as illustrated in FIG. 2.

Reference will now be made in detail to the present embodiments of the invention, examples of which are illustrated in the accompanying drawings.

DETAILED DESCRIPTION OF THE INVENTION

To provide a more satisfactory funding solution to an entity, embodiments of the present invention introduce a new type of synthetic instrument known as a "Total Fair Value Swap." A Total fair Value Swap may be a single swap transaction wherein the floating payment is a function of both interest rates and the perceived creditworthiness of a borrower (its "credit spread"). The purpose of a Total Fair Value Swap is to permit a borrower to obtain long-term funding at a floating rate of interest through the use of a single financial instrument. Previously, it would have been possible to achieve this result only through a combination of interest rate and highly illiquid credit default swaps. A Total Fair Value Swap may be entered into between two counterparties, a "Fixed Rate Payer" and a "Floating Rate Payer". A Floating Rate Payer in the swap may be an organization that needs funding, such as a public corporation, a private firm, a partnership, a limited liability company (LLC), or a municipality. For illustration purposes, this Floating Rate Payer is generally referred to as "Company" in the description below. The Fixed Rate Payer in the swap is typically a financial services provider such as an investment bank or a similar financial institution. This Floating Rate Payer is referred to as "Bank" in the description below. Theoretically, any two persons or entities may participate in a Total Fair Value Swap as long as their participation does not violate any applicable rules or regulations.

Figure 1:
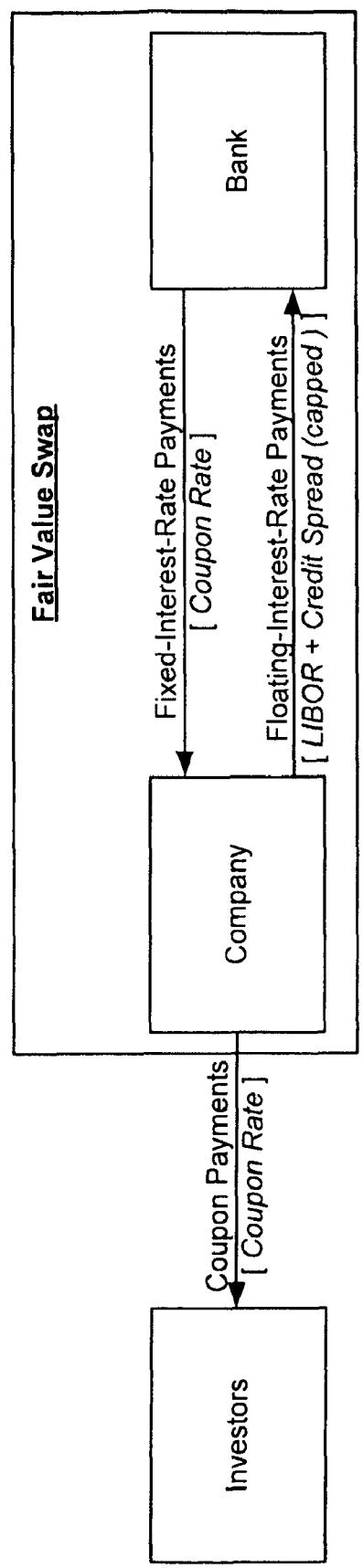
FIG. 1 is a block diagram illustrating an exemplary Total Fair Value Swap transaction according to an embodiment of the present invention.

Referring to FIG. 1, there is shown a block diagram illustrating an exemplary Total Fair Value Swap transaction according to an embodiment of the present invention.

Figure 2:
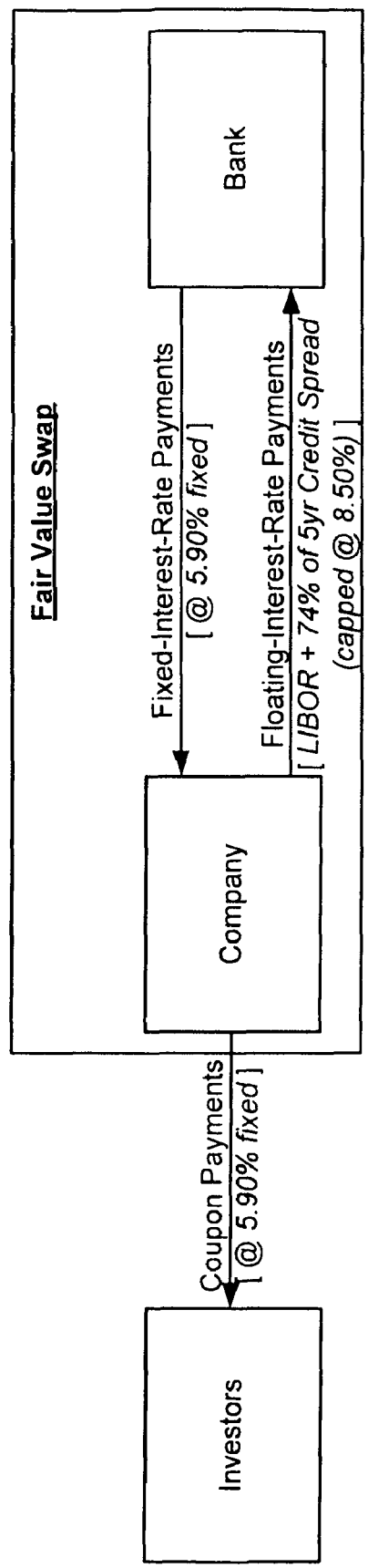
FIG. 2 is a block diagram illustrating another exemplary Total Fair Value Swap transaction according to an embodiment of the present invention.

A Total Fair Value Swap may be entered into by a Company either at the time such Company issues bonds or at any time thereafter. Furthermore, despite the illustrations in FIG. 1 and FIG. 2, issuance of a bond or other debt instrument by Company is not a precondition for entering into a Total Fair Value Swap in accordance with embodiments of the present invention.

In a typical scenario, Company may issue a bond to its investors, paying a fixed-rate coupon on a periodic basis. The Total Fair Value Swap between Company and Bank may involve two payment streams. The swap contract may be documented on the basis of standard derivatives documentation, such as that produced by the International Swaps and Derivatives Association, Inc. (ISDA). The Total Fair Value Swap may have a notional principal that is the same as or proportionate to the bond principal. Bank may agree to make fixed payments to Company based on such notional principal on a periodic basis. In return, Company may agree to make floating payments to Bank based on such notional principal on a periodic basis.

In the context of a Total Fair Value Swap, the term "fixed payments" may refer to payments with a truly fixed amount throughout the term of the swap, or the term "fixed payments" may refer to payments whose amounts are based on a reference rate as agreed upon by parties to the swap. According to one embodiment, the reference rate may be a fixed interest rate that is the same as or proportionate to the fixed-rate bond coupon. Alternatively, the reference rate may be a market interest rate or one that is reset periodically in a manner prescribed by the swap contract.

The floating payments in the Total Fair Value Swap may be based on a floating rate that comprises two portions, a first portion being based on a reference interest rate and a second portion being based on Company's credit spread. The reference interest rate may be any publicly quoted rate that can be used by parties to a financial contract. In a Total Fair Value Swap, a typical reference interest rate may be, for example, LIBOR rate, prime interest rate, the U.S. dollar swap rate, the U.S. Treasury Bond rate or any other widely traded interest rate that is reset periodically, or a variant or combination thereof. For example, if payments are made every six months between Company and Bank, the 6-month LIBOR rate at the beginning of every 6-month period may be used as the reference interest rate.

The credit spread portion of the floating rate may be based on Company's credit spread as observed from the CDS market. A credit spread typically reflects the likelihood that a company will default on its debts. A credit default swap is a contract that protects a party to the contract against the risk of a default by a particular company. In the CDS market where these contracts referencing various entities are traded, a company's credit risk may be observed and quantified with a price indicator known as a "credit spread." Companies with higher credit spreads are required to pay a correspondingly higher risk premium (i.e., a higher interest rate) to purchasers of their debt securities and other lenders. To be eligible for a Total Fair Value Swap, Company is typically required to have a verifiable credit spread for a predetermined number of years. According to one embodiment, it is preferable that Company has verifiable 5-year and 10-year credit spreads. Company's credit spread may be obtained from the CDS market and may be adjusted on a periodic basis. For example, if payments are made every six months between Company and Bank, a snapshot of Company's 5-year credit spread may be taken in the CDS market at the beginning of each 6-month period. This credit spread value may be used to determine the credit spread portion of the floating rate in the Total Fair Value Swap. Therefore, the amount of Company's floating-rate payments to Bank is, at least in part, based on Company's own credit risk at or around the time of each payment. Calculation of the credit spread portion of the floating rate may be done with a standard or proprietary pricing model that is capable of pricing Constant Maturity CDS transactions.

According to embodiments of the present invention, the credit spread portion of the floating rate in the Total Fair Value Swap may be set at a percentage of Company's credit spread as observed in the CDS market. The percentage may be set at a level that causes the net present value (NPV) of the Total Fair Value Swap to be zero on the date as of which the Company and the Bank enter into the Total Fair Value Swap. Further, the credit spread portion of the floating rate may be capped to protect Company against extreme increases in its credit spread. Bank may periodically re-calculate the credit-spread portion of the floating rate payment under the Total Fair Value Swap based on the Company's credit spread as observed periodically in the CDS market.

Company may apply the fixed payments received from Bank under the Total Fair Value Swap to pay the fixed-rate coupon due in respect of its bonds. Thus, by entering into the Total Fair Value Swap, Company has synthetically converted its fixed-rate bond liabilities into a floating rate liability in a manner that enables Company to benefit from lower short-term interest rates and from lowering of Company's own credit spreads.

The economic effect of a Total Fair Value Swap may be achieved through a combination of existing financial instruments (such as interest rate swaps and credit default swaps). For example, the net effect of a Total Fair Value Swap between Company and Bank may be achieved with an interest rate swap and a credit spread swap between the two counterparties. In the interest rate swap, Company pays Bank at a floating rate on the notional principal in exchange for fixed-rate periodic payments from Bank. In the credit spread swap, Company pays Bank at a floating, yet capped, credit spread on the notional principal in exchange for fixed-rate periodic payments from Bank. A combination of the interest rate swap and the credit spread swap may produce a same or similar effect as a Total Fair Value Swap in accordance with embodiments of the present invention. However, the present invention presents the significant advantage of achieving long-term funding at short-term rates through the use of a single financial instrument. Any combination of financial instruments that achieves an effect the same as or similar to the present invention should be considered to be within the scope of the present invention.

For a better understanding of the Total Fair Value Swap, a more detailed example is provided in FIGS. 2 and 3. FIG. 2 is a block diagram illustrating another exemplary Total Fair Value Swap transaction according to an embodiment of the present invention. FIG. 3 breaks down the economics of the exemplary Total Fair Value Swap transaction shown in FIG. 2.

In this example, Company issues a 5-year bond at a fixed coupon rate of 5.90% with a principal of $250M (M denotes million). The coupon rate may be paid every three months.

Company and Bank may enter into a 5-year Total Fair Value Swap with a notional principal of $250M, wherein Company pays Bank at a floating rate of LIBOR plus 74% of Company's 5-year credit spread in exchange for fixed payments from Bank at 5.90%. The credit spread portion of the floating rate is capped at 8.50%, so that Company will never have to pay more than LIBOR plus the product of 74% and 8.50%.

From the spreadsheet in FIG. 3, it may be seen that part of the 5.90% fixed coupon rate is based on the 5-year U.S. Treasury Bond interest rate (4.08%) and a 5-year swap spread (0.47%). On the first day of the first 3-month period in this example, the 3-month LIBOR rate is 3.12%, and Company's 5-year credit spread is 1.35%. The credit spread portion of the floating rate is 74%×1.35%=0.999%. Company enjoys 1.78% in interest payment savings during the first 3-month period. Thereafter, actual payments may vary according to fluctuations in the LIBOR rate and Company's credit spread, both of which may be determined on the first day of each 3-month period. However, the floating credit spread is capped at 8.50%. That is, at any time during the 5-year tenor of the Total Fair Value Swap, Company will pay no more than the product of 74% and 8.50% for the credit spread portion of the floating rate.

The Total Fair Value Swap transaction provides Company a number of advantages. For example, since a portion of the floating rate payable under a Total Fair Value Swap is tied to the creditworthiness of Company, Company benefits from the lowering of its own credit spreads. At the same time, Company has increased its floating rate exposure and generated interest expense savings. Compared to a "plain vanilla" interest rate swap alone, Company is now able to monetize a steep interest rate curve as well as a steep credit curve. Since the floating credit spread is capped at 8.50%, Company is protected in an extreme downside scenario.

Depending on Company's specific funding needs, a number of variations may be implemented for a Total Fair Value Swap. According to one variant of the Total Fair Value Swap, the fixed rate in the Total Fair Value Swap as described above may be replaced with a floating rate that is reset on a periodic basis.

According to another variant of the Fair Value Swap, the credit spread swap portion of the floating rate may be added to the floating rate leg of an existing interest rate swap, transforming that interest rate swap into a Total Fair Value Swap. Alternatively, either the interest rate portion or the credit spread portion of the floating rate leg of a Total Fair Value Swap may be terminated or have its rate changed at a later time.

In a further variant of the Total Fair Value Swap, Company may purchase an option to enter into the transaction. Further, the Total Fair Value Swap may contain an early termination option that permits Company or Bank to terminate the transaction before its scheduled maturity date, either with or without compensating termination payments. In a further variant of the Total Fair Value Swap, the transaction as a whole or any part thereof may terminate (or "knock out") upon the occurrence of one or more specified events (which may be called "credit events") with respect to Company or a third party.

A Total Fair Value Swap transaction in accordance with the present invention may be typically implemented in a computer-based system. The computer-based system may comprise one or more processors and/or computers capable of data manipulation, logic operation and mathematical calculation. The system may also comprise one or more databases for storing and managing interest rate data, credit spread data, and payment data, for example. The system may further comprise computer readable medium having pricing model programs for evaluating a company's credit spread. In addition, a number of user interfaces may be provided for a financial institution's personnel to model the swap pricing and to monitor/adjust both the credit spread portion and interest rate portion of the floating rate payment as well as the fixed rate payment to be made pursuant to the transaction. A counterparty in the Total Fair Value Swap may also monitor the swap performance via one or more user interfaces. The system may be implemented on computers or computer networks.

Figure 4:
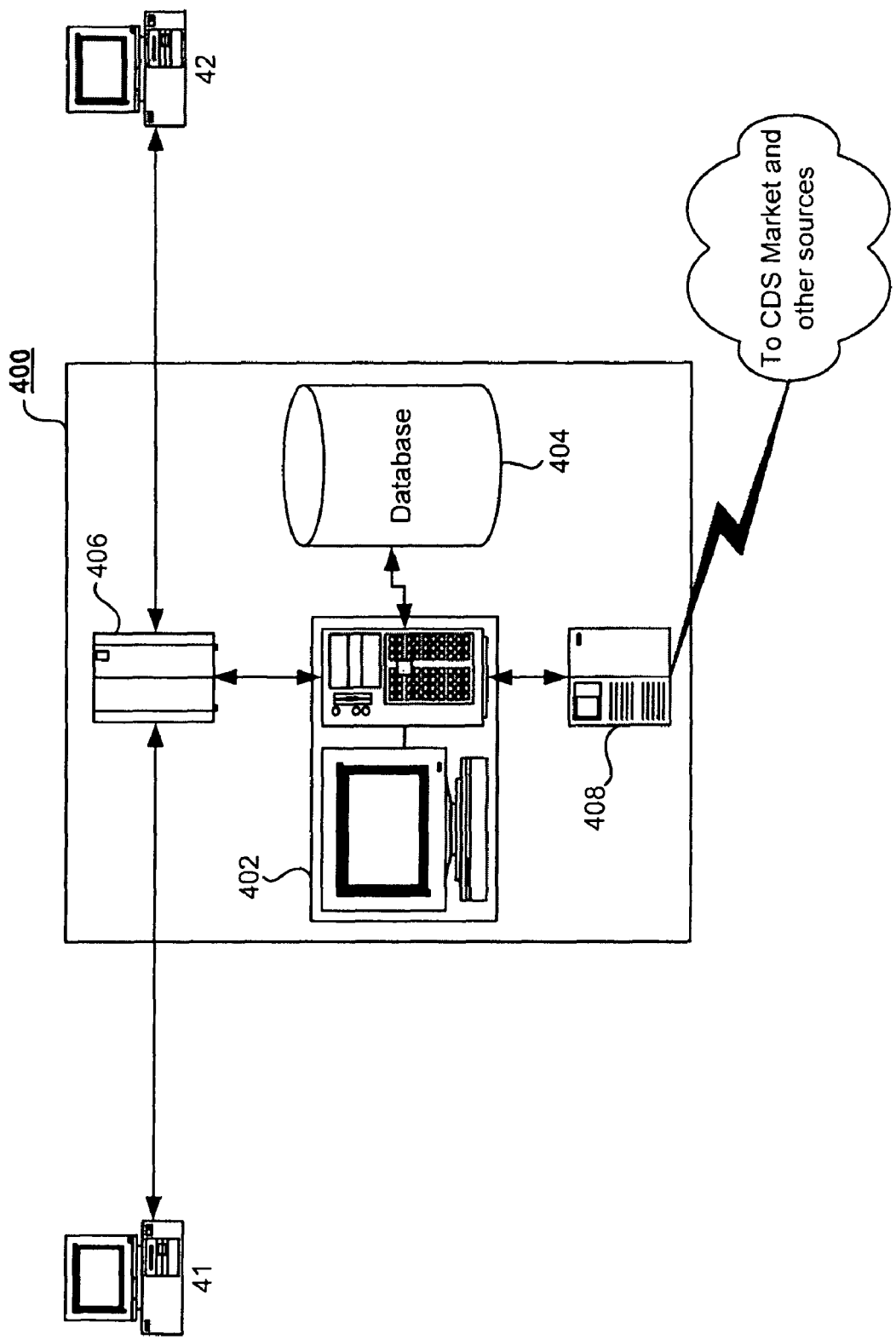
FIG. 4 is a block diagram illustrating an exemplary system for facilitating one or more Total Fair Value Swap transactions in accordance with an embodiment of the present invention.

Referring to FIG. 4, there is shown a block diagram illustrating an exemplary system 400 for facilitating one or more Total Fair Value Swap transactions in accordance with an embodiment of the present invention. The system 400 may comprise a transaction management unit 402 which may be a personal computer, a server or other similar computer equipment. The transaction management unit 402 may be coupled to a database 404 that stores and maintains electronic records associated with one or more Total Fair Value Swap transactions. For each Total Fair Value Swap, the electronic record may reflect the payment obligations of each counterparty, the notional principal, applicable interest rates, and algorithm for determining payment amounts, for example. The transaction management unit 402 may also be coupled to a network interface device 406 through which counterparties (e.g. 41 and 42) to a Total Fair Value Swap transaction may access the system 400. The transaction management unit 402 may be further coupled to a rate monitoring unit 408 that is capable of retrieving pricing information, via a communication link, from the credit default swap (CDS) market and/or other sources. Although the various components in the system 400 are illustrated as being separate from one another, it should be noted that some or all of them may be integrated within the same computing equipment and still perform the desired functions as described herein.

One counterparty (typically the "Fixed Rate Payer") to a Total Fair Value Swap transaction may assume the functions of monitoring the other counterparty's credit spread and calculating floating payment amounts. In that case, the counterparty that does the monitoring and calculation may manage the system 400 or have administrative privileges therein. In the case of multiple Total Fair Value Swap transactions being facilitated by the system 400, if the Fixed Rate Payers happen to be the same bank, the hank may manage the system 400. If the multiple transactions involve different Fixed Rate Payers, the system 400 may be managed by a neutral party with respect to all the transactions.

In operation, an agreement for a Total Fair Value Swap transaction may be reached between counterparties 41 and 42. For example, the counterparty 41 may be the "Fixed Rate Payee" who will make fixed payments to the counterparty 42 based on a reference interest rate that may or may not vary with time. The counterparty 42 may be the "Floating Rate Payer" who will make floating payments to the counterparty 41 based at least in part on a credit spread associated with the counterparty 42. The agreement and all relevant records may be stored in the database 404. At the beginning of each payment period, the rate monitoring unit 408 may retrieve the counterparty 42's credit spread data from the CDS market and/or other relevant pricing data from other sources. With the credit spread data and other pricing data, together with relevant data from the database 404, the transaction management unit 402 may calculate the floating payment amount as well as the fixed payment amount. Ahead of payment due date(s), electronic reminders may be sent to the counterparties 41 and 42 respectively. Payment transaction data may be collected from the counterparties, checked for compliance with the agreement, and stored in the database 404 for future reference. The system 400 may be further configured to receive data associated with one or more specified triggering events that may cause the Total Fair Value Swap transaction to be terminated if predetermined conditions are met.

Figure 5:
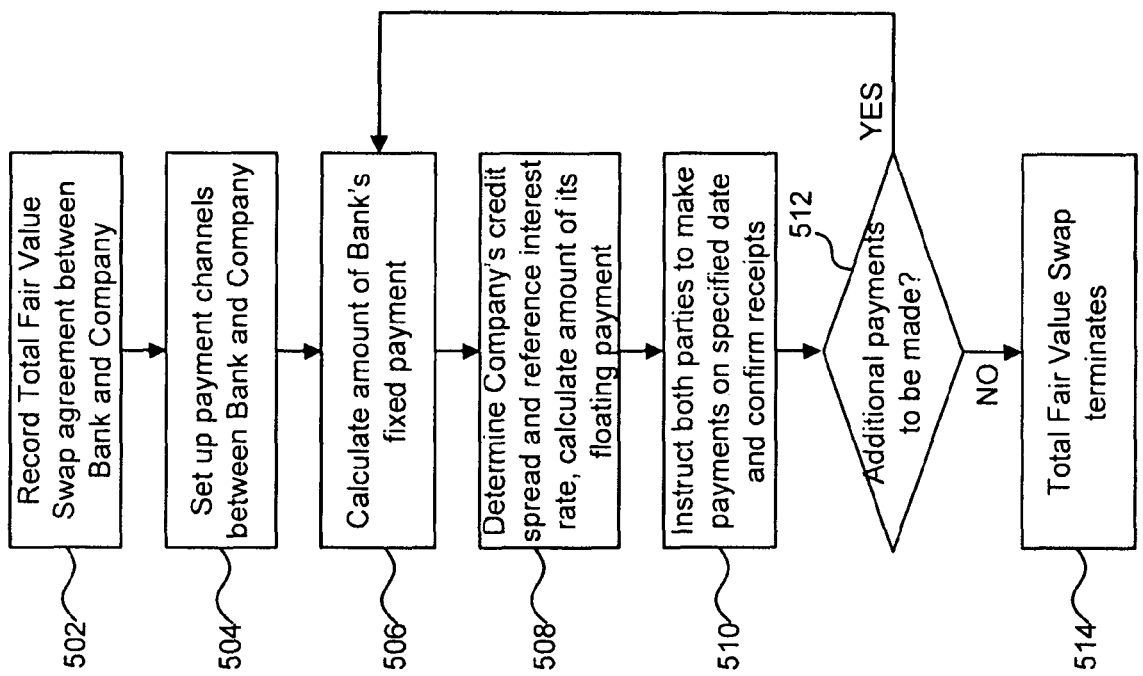
FIG. 5 is a flow chart illustrating an exemplary method for facilitating a Total Fair Value Swap transaction in accordance with an embodiment of the present invention.

FIG. 5 is a flow chart illustrating an exemplary method for facilitating a Total Fair Value Swap transaction in accordance with an embodiment of the present invention.

In step 502, two counterparties, Bank and Company, may enter into a Total Fair Value Swap agreement, wherein Bank promises to make fixed payments to Company based on a reference interest rate, and Company promises to make floating payments to Bank based, at least in part, on Company's credit spread. The agreement may be executed by the parties and recorded in an electronic medium.

In step 504, payment channels may be set up for Bank and Company to make payments to one another. Typically, electronic fund transfers (EFTs) may be established so that electronic payments may be made automatically according to the Total Fair Value Swap agreement.

In step 506, typically at the beginning of a payment period (e.g., beginning of every 3-month period), Bank may calculate the amount of Bank's fixed payment based on a fixed rate or a reference rate as agreed upon by the counterparties. Therefore, the fixed payments may be the same amount for every payment period. Alternatively, Bank's payment amount may vary with time, depending on the reference rate that may be reset or adjusted according to a market rate for the relevant payment period. In this case, Bank's payment amount may be re-calculated for each payment period.

In step 508, typically at the beginning of a payment period, Bank may observe Company's credit spread in a CDS market and calculate Company's floating payment amount based at least in part on its credit spread. According to some embodiments of the present invention, Company's floating payment amount may be determined based on a floating rate that may comprise an "interest rate portion" and a "credit spread portion." The interest rate portion may be either fixed throughout the term of the Total Fair Value Swap or may be reset on a periodic basis. The credit spread portion may be a percentage value that is the same as or proportionate to Company's credit spread. The credit spread portion may be capped at a specified level so that Company is only exposed to limited risk of a potential drop in its credit ratings. In one embodiment, the floating rate is the sum of LIBOR rate and a percentage of Company's credit spread.

In step 510, both parties may be instructed to make their payments on specified due date(s), and receipts of the payments may be confirmed and recorded.

In step 512, it may be determined whether additional payments are to be made. If so, the process may loop back to step 506 for the upcoming payment period. If the last payments in the Total Fair Value Swap have been made, the Total Fair Value Swap may be terminated in step 514.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. A system for facilitating a Total Fair Value Swap transaction between a first counterparty and a second counterparty, comprising:
   a transaction management processor, a rate monitor, and a database;
   the database maintaining an electronic record related to the Total Fair Value Swap transaction, the record reflecting the first counterparty's obligation to make one or more fixed payments to the second counterparty and the second counterparty's obligation to make floating payments to the first counterparty;
   the transaction management processor being configured to:
      calculate an amount for each fixed payment based on a reference interest rate determined by the rate monitor,
      derive, based on information retrieved by the rate monitor from a credit default swap market, a credit spread associated with the second counterparty at a specified time prior to each floating payment,
      determine, based on each derived credit spread, an amount for each floating payment, such that the amount for each determined floating payment varies when the derived credit spread of the second counterparty varies, and
      manage receipt of the one or more fixed payments and the floating payments, where managing comprises at least one of confirming, recording, and scheduling of the fixed and floating payments.

2. The method according to claim 1, wherein the reference interest rate is determined based on one or more interest rates selected from a group consisting of:
   London Inter-Bank Offer Rate (LIBOR);
   prime interest rate;
   U.S. dollar swap rate;

U.S. Treasury Bond rate; and federal funds rate.

3. The system according to claim 1, wherein the transaction management processor is further configured to:

reset the reference interest rate on a periodic basis, thereby varying the one or more fixed payments.

4. The system according to claim 1, wherein each floating payment amount is determined based on a floating rate comprising a first portion and a second portion, wherein the first portion is determined based on an interest rate unrelated to the credit spread, and wherein the second portion is determined based on the credit spread.

5. The system according to claim 4, wherein the second portion is determined based on a predetermined percentage of the credit spread.

6. The system according to claim 5, wherein the predetermined percentage causes a net present value of the Total Fair Value Swap transaction to be zero at initiation of the Total Fair Value Swap transaction.

7. The system according to claim 1, wherein the transaction management processor is further configured to:

set a maximum amount for the one or more floating payments when the credit spread is above a predetermined level.

8. The system according to claim 1, wherein the transaction management processor is further configured to:

cause at least a portion of the Total Fair Value Swap transaction to terminate upon one or more credit events associated with the second counterparty or a third party.

* * * * *